C. H. TAYLOR.
AUTOMATIC CONTROLLER FOR EXPLOSION MOTOR DRIVEN MECHANISM.
APPLICATION FILED MAR. 29, 1911.

1,068,945.

Patented July 29, 1913.

Witnesses

Inventor
Cecil Hamelin Taylor
By Whittemore Hulbert & Whittemore
Attys.

UNITED STATES PATENT OFFICE.

CECIL HAMELIN TAYLOR, OF DETROIT, MICHIGAN.

AUTOMATIC CONTROLLER FOR EXPLOSION-MOTOR-DRIVEN MECHANISM.

1,068,945.  Specification of Letters Patent.  Patented July 29, 1913.

Application filed March 29, 1911. Serial No. 617,574.

*To all whom it may concern:*

Be it known that I, CECIL HAMELIN TAYLOR, a citizen of the United States of America, residing at Detroit, in the county of Wayne and State of Michigan, have invented certain new and useful Improvements in Automatic Controllers for Explosion-Motor-Driven Mechanism, of which the following is a specification, reference being had therein to the accompanying drawings.

The invention relates to a controller more particularly designed for use in connection with motor vehicles, and it is the object of the invention to prevent the operation of the mechanism under abnormal conditions.

To this end the invention consists first in the means for controlling the motor by the short circuiting of the ignition circuit, second, in the means for operating said controller by the lubricating system, and further in various features of construction as hereinafter set forth.

Figure 1:
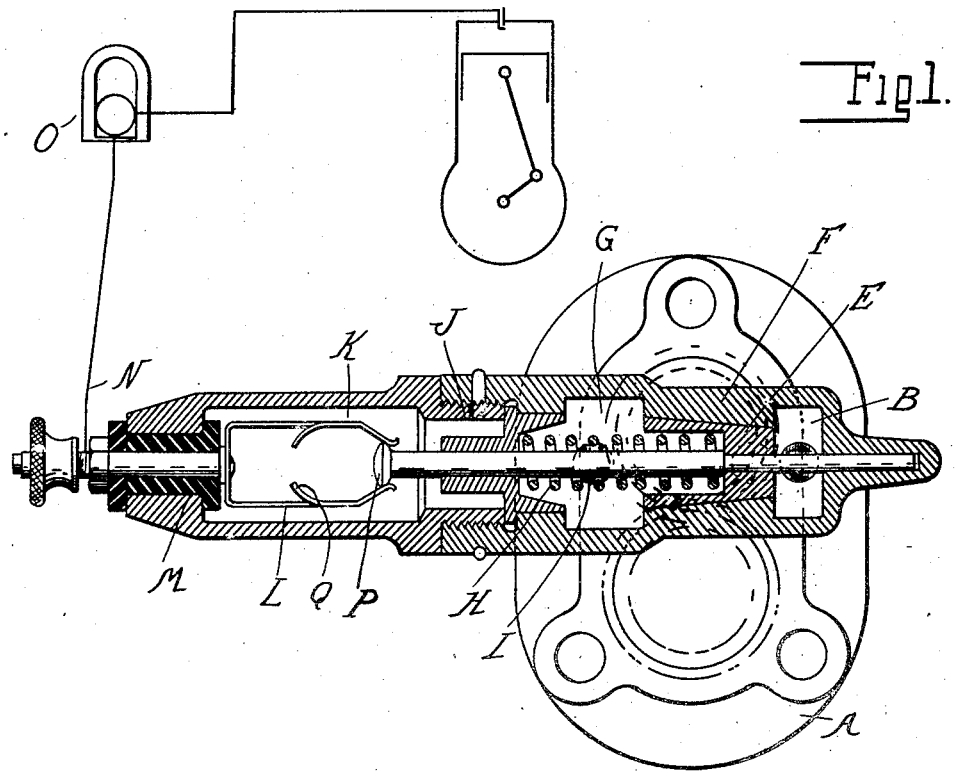
Figure 2:
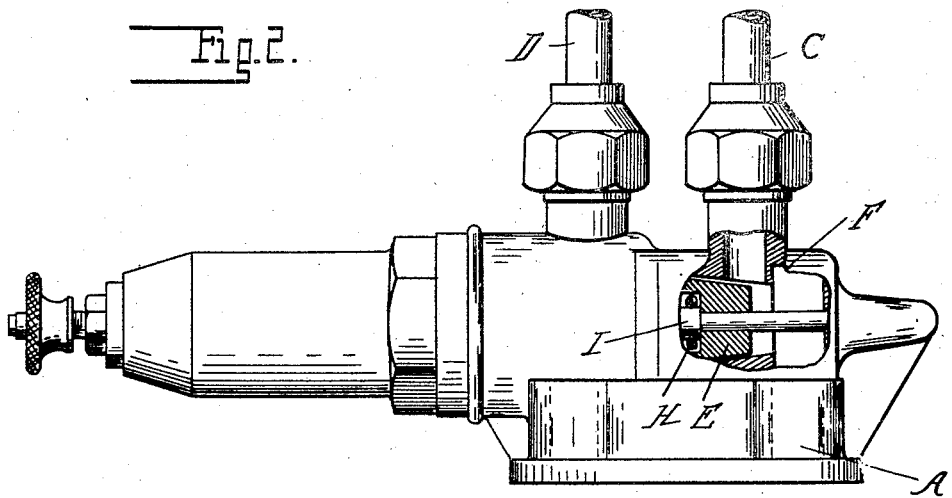

In the drawings, Figure 1 is a longitudinal section of the controller showing diagrammatically the magneto generator and arrangement of ignition circuits; Fig. 2 is a side elevation.

For use in commercial work it is desirable to obtain motor vehicle constructions which require for their operation a minimum amount of intelligence or skill on the part of the operator. One of the vital parts of the mechanism is the lubricating system and frequently serious damage may be done to the car by the operation of the same without proper lubrication. Again it is desirable to guard against over speeding of the motor whether or not it is capable, with the transmission of the vehicle. I have therefore, devised a construction in which the operation of the motor is dependent upon the operativeness of the lubricating system and by which a governing effect is also produced preventing over speeding.

In detail, A is a propelling pump for the lubricant and which is arranged in any desired relation to the motor and mechanism driven thereby (not shown). This pump is shown as of the intermeshing gear type, the lubricant being discharged into a chamber B from which it is fed through a conduit C to the various bearings to be lubricated and is returned through a conduit D to the pump.

E is a plunger or piston which is arranged in the path of the lubricant passing from the chamber B to the conduit C. This piston is preferably of a tapering form fitting a correspondingly tapering passage in a casing F which connects the chamber B with a chamber G communicating with the return conduit D.

H is a spring for holding the piston E against the tapering seat and I is a shank extending rearward from the piston and passing out through a packing gland J into a chamber K.

L is an electrical contact member located within the chamber K and mounted upon an insulator support M. This contact is connected by a suitable conductor N with one of the leads from the magneto generator O, the arrangement being such that when a knob P on the shank I contacts with the member L the magneto will be grounded or short circuited.

With the construction as described it is evident that when the mechanism is at rest the piston E will be held by the spring H against the conical seat which will cut-off communication between the chamber B and the outlet conduit C of the lubricating system. In this position of parts the knob P will be in electrical contact with the member K and thus short circuits the magneto generator. In starting the engine, the initial cranking will impart sufficient movement to the gear pump to cause the pressure of the lubricant in the chamber B to force backward the piston E and thereby break the short circuit connection for the magneto. This will permit the igniter to operate and the engine may thus be started in the usual way. On the other hand, if there is a failure in supply of lubricant there will be nothing to cause the movement of the piston E, and by reason of the grounding or short circuiting of the magneto the engine cannot be started. After the engine has been successfully started and the vehicle set in motion, the constant flow of lubricant from the chamber B will hold back the piston E so as to continue the operativeness of the ignition system, but any time when there is a stoppage in the flow of the lubricant, or a failure in the supply, the spring H will return the piston and will short circuit the magneto.

If the engine is driven at normal speed the excess of lubricant over that which can pass through the lubricating system will flow through the clearance between the tapering piston E and the tapering recess, this constituting a by-pass to the inlet chamber G of the pump. An abnormal speed of the motor will increase the volume of oil forced through the by-pass thereby increasing the pressure and pushing the piston backward still farther against the tension of the spring H. This additional movement of the piston will force the contact P against another bearing Q on the member L which will again short circuit, interrupting the operation of the igniters. This in turn will temporarily prevent the operation of the engine until the speed is decreased, whereupon the contact Q will again be withdrawn and the short circuit broken.

It is obvious that the controller above described may be employed in connection with any explosion motor driven mechanism, but it is particularly applicable for use in connection with motor vehicles.

What I claim as my invention is:

1. The combination with explosion driven mechanism, of a fluid pump operated by said mechanism, an ignition system, means for short circuiting said ignition system, and means operated by the fluid propelled by said pump for opening said short circuit.

2. The combination with a motor driven mechanism, of a fluid pump actuated by said mechanism, and means actuated by the fluid propelled by said pump for controlling said mechanism.

3. The combination with explosion motor driven mechanism, of a fluid pump actuated by said mechanism, an electrical ignition system, and means controlling said ignition system actuated by the fluid propelled by said pump.

4. The combination with a fluid pump, of an electric circuit, and means controlling said circuit operated upon an abnormal under or overflow of the liquid within the pump.

5. The combination with a fluid pump, of a piston subjected to the fluid pressure developed by said pump, an electric circuit, and means actuated by the plunger for controlling said circuit operated upon an abnormal under and overflow of the liquid in the pump.

6. The combination with a fluid pump, of a spring-pressed piston arranged in the path of the fluid propelled by said pump, an electric circuit, means actuated by said spring-pressed piston for controlling said circuit operated upon an abnormal under and overflow of the liquid within the pump.

7. The combination with a fluid pump, of a spring pressed piston normally obstructing the flow of fluid from said pump, and movable by the pressure of the fluid out of the path thereof, an electric circuit, and means actuated by the spring-pressed piston for controlling said circuit operated upon an abnormal under or overflow of the liquid in the pump.

8. The combination with explosion motor driven mechanism, of a lubricating system, a fluid pump for propelling the lubricant actuated by said mechanism, and means controlling said mechanism operated by an abnormal over or under pressure of fluid in said lubricating system.

9. The combination with a lubricating system for explosion motor driven mechanism, of means for stopping the motor upon an abnormal flow of lubricant in the lubricating system.

10. The combination with a lubricating system for explosion motor driven mechanism, of means for rendering the ignition system inoperative upon an abnormal flow of lubricant in the lubricating system.

In testimony whereof I affix my signature in presence of two witnesses.

CECIL HAMELIN TAYLOR.

Witnesses:
JAMES P. BARRY,
W. J. BELKNAP.